Patented July 11, 1933

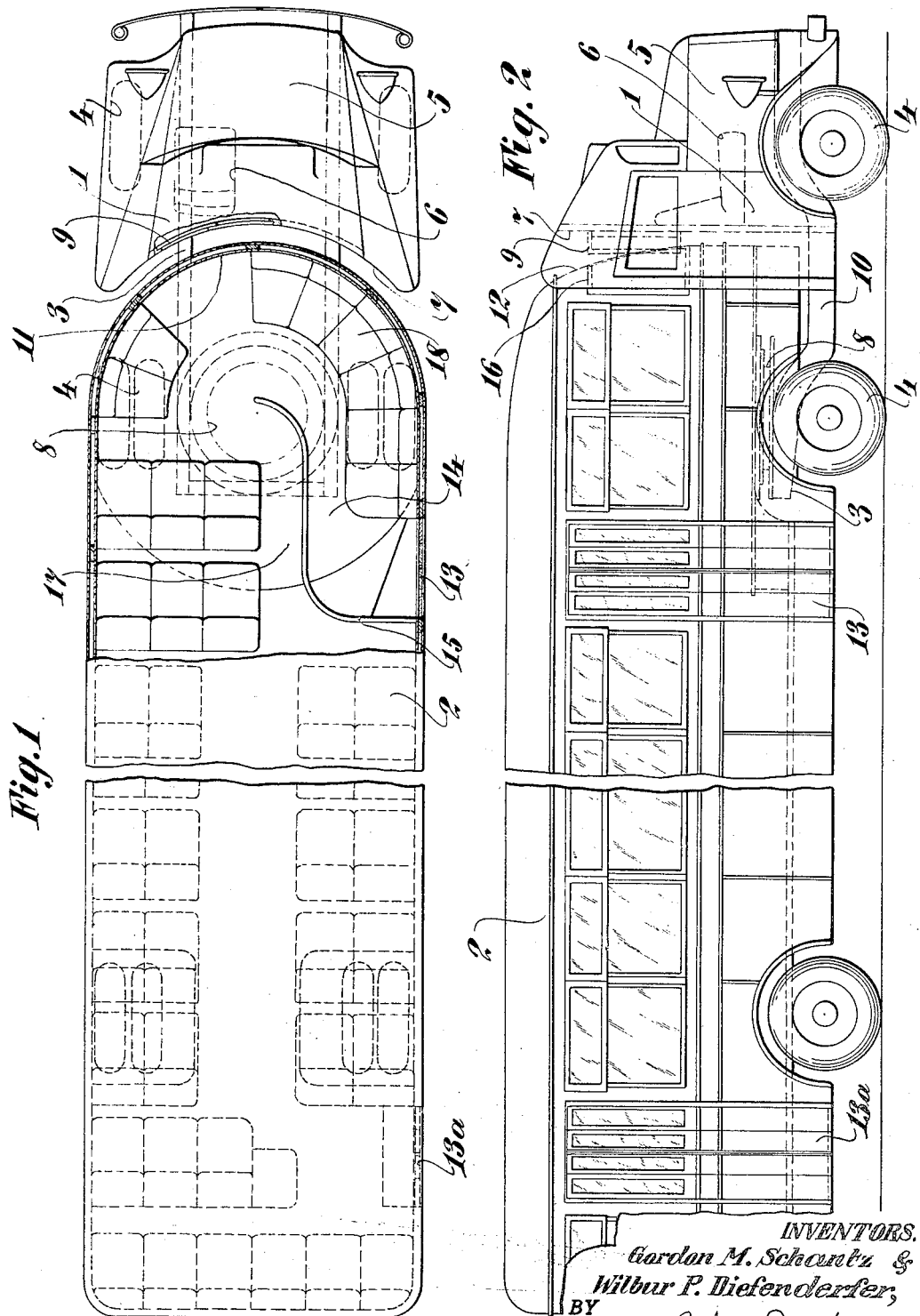

1,917,396

UNITED STATES PATENT OFFICE

GORDON M. SCHANTZ AND WILBUR P. DIEFENDERFER, OF ALLENTOWN, PENNSYLVANIA, ASSIGNORS TO INTERNATIONAL MOTOR COMPANY, OF NEW YORK, N. Y., A CORPORATION OF DELAWARE

TRACTOR BUS BODY

Application filed August 7, 1931. Serial No. 555,783.

The present invention relates to bodies for motor vehicles and embodies, more specifically, an improved tractor trailer construction, the body whereof constitutes the trailer of the vehicle and is suitably connected to the tractor which carries the source of power. More particularly, the invention embodies an improved commercial vehicle body, the passenger carrying portion of which is in the form of a trailer mounted upon the tractor through a suitable fifth wheel connection.

The application of tractor trailer principles to commercial vehicles of the passenger carrying type has never before been made, the difficulty due to the isolation of the vehicle operator from the passenger compartment being the chief objection to such construction. The desirable characteristics of a tractor trailer vehicle construction, particularly in fleet operation, will be readily apparent since spare trailer or tractor units may be provided to be substituted for corresponding units of vehicles in operation upon the falling into disrepair thereof. An object of the invention accordingly is to provide a vehicle of the tractor trailer type which is adapted for carrying passengers, the connection between the tractor and trailer being effected by means of a suitable fifth wheel and means being provided to afford access between the vehicle operator's cab upon the tractor and the passenger compartment upon the trailer.

A further object of the invention is to provide an improved vehicle construction of the above character wherein the seating structure of the trailer is such as to afford a maximum passenger capacity without disturbing the standard requirements for vehicle bodies of this type.

A further object of the invention is to provide a commercial vehicle of the passenger carrying type, wherein the passenger carrying compartment is effectively isolated from the operator's compartment and the engine compartment.

Further objects, not specifically enumerated above, will be apparent as the invention is described in greater detail in connection with the accompanying drawing, wherein:

Figure 1 is a plan view, partly broken away and in section, showing a vehicle constructed in accordance with the present invention.

Figure 2 is a view in side elevation, showing the vehicle of Figure 1.

Referring to the above drawing, the invention will be seen to be embodied in a tractor trailer type of passenger carrying vehicle wherein the tractor is shown at 1 and the trailer at 2. The tractor frame 3 is mounted upon suitable front and rear wheels 4 and the usual engine compartment 5 and operator's seat 6 is provided. The rear wall 7 of the operator's compartment is formed with a curvature which is concentric to the axis of a fifth wheel 8 which is carried upon the tractor frame. This wheel may be of standard design and forms no part of the present invention. In the rear curved wall 7, windows 9 are provided to cooperate with windows formed in the adjacent portion of the trailer body to be described hereinafter. The frame members 3 of the tractor frame are preferably depressed at 10 to decrease the overall height of the trailer body and facilitate the movement of passengers into the trailer body.

The forward end of the trailer body is preferably curved at 11 about the axis of the fifth wheel 8 to conform to the curvature of the rear wall 7 of the tractor cab. It is also preferred to stream line the forward portion of the body at 12 to afford a more pleasing contour line, as well as to provide greater clearance between the opposed portions of the trailer and cab at the tops thereof. In this fashion, relative movement of the tractor and trailer about a horizontal axis passing transversely through the fifth wheel is effectively accommodated without causing interference between these parts. Rearwardly of the plane of the rear wheels of the tractor, a door 13 is provided in the trailer body to receive passengers. A rear door 13ª may be provided as is customary in vehicles of this character and the interior of the rear portion of the trailer body may be arranged in any desired fashion. Adjacent the front door 13, a forward aisle 14 is formed by a guard rail 15 and passengers are thus directed forwardly into the vehicle body where they must pass in comparatively close proximity to the driver's seat 6 and window 9 in the tractor. Suitable windows are formed in the forward curved portion 11 to cooperate with windows 9 and thus permit the operator or driver to communicate with passengers entering the trailer body. These windows are indicated at 16 in Figure 2.

After passing forwardly, a parallel aisle 17 is provided through which the passengers might move rearwardly into the after portion of the trailer body and into the main seating portions thereof. Circumferentially disposed seats 18 are mounted about the curved forward end of the trailer body and the passenger carrying capacity of the vehicle is thus considerably increased. The adaptability of these units for rapid interchange of tractors and trailers will be readily apparent and thus a fleet of vehicles may be kept in the proper condition of repair without requiring an undue number of idle units. Due to the three point suspension of the trailer body, the latter may be built cheaply and comparatively light and all vibration and chassis noises from the tractor would be substantially eliminated. Not only does the foregoing construction afford a large capacity with overall length within the legal limits but the turning radius of the vehicle is smaller than with the conventional type of passenger carrying vehicle. Due to the uniform distribution of weight and the use of dual tires in front as well as in the front of the passenger carrying body, small tires may be utilized and the isolation of the passenger compartment from the engine compartment effectively eliminates any carbon monoxide fire hazard, the gas tank and exhaust pipe being carried entirely upon the tractor. The passenger carrying body not only has a low center of gravity but may be formed with a low loading platform and the braking and traction power is greatly increased over standard designs.

While the invention has been described with specific reference to the accompanying drawing, it is not to be limited, save as defined in the appended claim.

We claim as our invention:

In combination with a tractor carrying an operator's cab and driving mechanism and a trailer having a body adapted to carry passengers, a fifth wheel mounting the trailer on the tractor, the front wall of the body and rear wall of the cab being curved substantially upon the axis of the fifth wheel, spaced windows in the curved walls of the cab and trailer, respectively, a door in the side of the body, and a guard to direct passengers from the doors in front of the windows.

This specification signed this 3rd day of August, A. D. 1931.

GORDON M. SCHANTZ.
WILBUR P. DIEFENDERFER.